(12) United States Patent
Zhou

(10) Patent No.: US 12,308,437 B2
(45) Date of Patent: May 20, 2025

(54) POSITIVE ELECTRODE AND ELECTROCHEMICAL APPARATUS AND ELECTRONIC APPARATUS CONTAINING SAME

(71) Applicant: Ningde Amperex Technology Limited, Fujian (CN)

(72) Inventor: Molin Zhou, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 529 days.

(21) Appl. No.: 17/708,089

(22) Filed: Mar. 30, 2022

(65) Prior Publication Data

US 2022/0223878 A1 Jul. 14, 2022

Related U.S. Application Data

(63) Continuation of application No. PCT/CN2019/122057, filed on Nov. 29, 2019.

(30) Foreign Application Priority Data

Nov. 4, 2019 (CN) .......................... 201911067680.8

(51) Int. Cl.
| | |
|---|---|
| *H01M 4/62* | (2006.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC ........... *H01M 4/626* (2013.01); *H01M 4/505* (2013.01); *H01M 4/525* (2013.01); *H01M 4/623* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2011/0168550 A1* | 7/2011 | Wang .................... | H01M 4/131 204/290.01 |
| 2016/0308215 A1* | 10/2016 | Miyata .............. | H01M 10/0525 |
| 2019/0296338 A1 | 9/2019 | Masaki et al. | |

FOREIGN PATENT DOCUMENTS

| | | |
|---|---|---|
| CN | 103066282 A | 4/2013 |
| CN | 103117373 A | 5/2013 |
| CN | 103956458 A | 7/2014 |

(Continued)

OTHER PUBLICATIONS

International Search Report and Written Opinion for Application No. PCT/CN2019/122057, mailed on May 25, 2020, 6 pages.

(Continued)

*Primary Examiner* — Wyatt P McConnell
(74) *Attorney, Agent, or Firm* — Maier & Maier, PLLC

(57) ABSTRACT

The present application relates to a positive electrode and an electrochemical apparatus and an electronic apparatus containing the same. The positive electrode includes a conductive agent, where the conductive agent includes a non-carbon material. The present application provides a positive electrode that includes a conductive agent with high voltage and oxidization resistance, which can effectively improve high voltage cycle performance of the electrochemical apparatus.

13 Claims, 2 Drawing Sheets

(56) References Cited

FOREIGN PATENT DOCUMENTS

| | | |
|---|---|---|
| CN | 104733774 A | 6/2015 |
| CN | 105742637 A | 7/2016 |
| CN | 107706366 A | 2/2018 |
| CN | 108666575 A | 10/2018 |
| CN | 109585840 A | 4/2019 |
| CN | 110224120 A | 9/2019 |
| JP | H06163051 A | 6/1994 |
| JP | 2002050358 A | 2/2002 |

OTHER PUBLICATIONS

First Official Action in Chinese Application 201911067680.8, dated Jul. 30, 2020.
Second Official Action in Chinese Application 201911067680.8, dated Nov. 5, 2020.

\* cited by examiner

POSITIVE ELECTRODE AND ELECTROCHEMICAL APPARATUS AND ELECTRONIC APPARATUS CONTAINING SAME

CROSS-REFERENCE TO RELATED APPLICATIONS

This application is a Continuation of PCT/CN2019/122057 filed on Nov. 29, 2019 which claims the benefit of priority from Chinese patent application 201911067680.8 filed on Nov. 4, 2019, the disclosure of which is hereby incorporated by reference in its entirety.

TECHNICAL FIELD

The present application relates to the field of energy storage technologies, and in particular, to a positive electrode and an electrochemical apparatus and an electronic apparatus containing the same, where the positive electrode includes a conductive agent that includes a non-carbon material.

BACKGROUND

Lithium-ion batteries have advantages such as high energy density, high power density, long life, high security, low self-discharge, and acclimating to a wide range of temperatures, and therefore are extensively applied in fields such as portable electronic products, e-mobility, defense and aerospace, and energy conservation. To further satisfy the market requirements for batteries with high energy density, expanding the charging cut-off voltage of positive electrode materials and developing new materials with higher specific energy are becoming an inevitable direction of research.

A lithium-ion battery mainly includes a positive electrode, a negative electrode, a separator, and a electrolyte solution. Improving performance of positive electrode materials is key to improving comprehensive performance of the lithium-ion battery. This is not only because positive electrode materials account for more than 40% of an overall cost of the lithium-ion battery, but more importantly, a power density of the lithium-ion battery increases approximately 28% at each increase of 50% in specific capacities of positive electrode materials.

At present, positive electrode active materials that are widely applied in the market mainly include layer-structure $LiCoO_2$ and $LiNi_xCo_yMn_zO_2$ (x+y+z=1), spinel-structure $LiMn_2O_4$, and olivine-structure $LiFePO_4$. Since being made commercially available by Sony (Sony) Corporation in 1991, the $LiCoO_2$ material has been playing an important role on the positive electrode active material market. $LiCoO_2$ has a theoretical specific capacity of approximately 274 mAh/g and a compacted density in a range of 4.1 $g/cm^3$ to 4.2 $g/cm^3$. During charging, $Li^+$ is separated from a $LiCoO_2$ structure to form $Li_{1-x}CoO_2$. When $0.07 \leq x \leq 0.25$, transformation from an O3 phase (O is arranged in a sequence of ABCABC along a direction of (001) in a lattice structure) into an O2 phase (O is arranged in a sequence of ABACABAC along the direction of (001) in the lattice structure) occurs in the material. When $0.25 \leq x \leq 0.43$, transformation from the O2 phase into an O1 phase (O is arranged in a sequence of ABABAB along the direction of (001) in the lattice structure) occurs in the material. When $0.43 \leq x \leq 0.52$, transformation from the O2 phase into the O1 phase is completed in the material. As delithiation continues, structures of positive electrode active materials may become unstable. In a severe case, the structures of the positive electrode active materials may collapse.

Stability of the $LiCoO_2$ structure can be effectively improved through doping and coating. Consequently, a charging cut-off voltage of the $LiCoO_2$ structure is expanded and a specific capacity is improved. At present, in the academia and industrial fields, methods such as Al, Ti, Zr, and Mg doping and coating with $Al_2O_3$, MgO, and $ZrO_2$ are used to make important progress in $LiCoO_2$ materials for a high voltage (>4.5 V vs. Li/Li+). Recently, in an existing article (Zhang et al., "Trace doping of multiple elements enables stable battery cycling of $LiCoO_2$ at 4.6 V", 2018, Nature energy, Volume 4, Pages 594-603), a cut-off voltage for stable charging and discharging of the $LiCoO_2$ materials is increased to 4.6 V through Ti—Mg—Al co-doping.

In addition to the positive electrode active material, the positive electrode of the lithium-ion battery further includes a conductive agent. At present, a common conductive agent is the carbon material. However, existing documentation (such as Du et al., "Influence of Electronic Conducting Additives on Cycle Performance of Garnet-based Solid Lithium Batteries", 2018, Journal of Inorganic Materials, Volume 33, Pages 462-468 and Zhao et al., "Solid Garnet Batteries", 2019, Joule, Volume 3, Pages 1-10) points out that in a high voltage system, a carbon material is not a good conductive agent. When a lithium-ion battery performs long time charge and discharge cycles under a high cut-off voltage (especially for a cut-off voltage of greater than or equal to 4.5 V), the carbon material that is used as the conductive agent may be quickly oxidized to generate carbonas, leading to increased resistance, decreased electronic conductivity, and eventually accelerating failure of the lithium-ion battery due to increased polarization.

SUMMARY

The present application provides a positive electrode and an electrochemical apparatus and an electronic apparatus containing the same, in an attempt to resolve, at least to some extent, at least one problem present in a related field.

The present application provides a positive electrode. The positive electrode includes a conductive agent that includes a non-carbon material, which can effectively improve cycle performance of a positive electrode active material (such as $LiCoO_2$) under a high voltage and demonstrates a good application prospect for other positive electrode active materials that have a high charging cut-off voltage and a high specific capacity (such as a lithium-rich manganese-based material or a nickel manganese spinel material).

According to an embodiment of the present application, the present application provides a positive electrode including a conductive agent, where the conductive agent includes a non-carbon material.

According to an embodiment of the present application, the non-carbon material contains a semiconducting oxide.

According to an embodiment of the present application, the semiconducting oxide includes at least one of tin oxide, indium oxide, antimony tin oxide, or indium tin oxide.

According to an embodiment of the present application, when the semiconducting oxide is indium tin oxide and antimony tin oxide, a molar ratio of tin to indium or antimony to tin in the semiconducting oxide is 0.1:1 to 0.5:1.

According to an embodiment of the present application, a particle diameter of the conductive agent is less than or equal to approximately 100 nm, and preferably, less than or equal to approximately 50 nm.

According to an embodiment of the present application, the positive electrode further includes a positive electrode active material and a binder, where the positive electrode active material includes a positive electrode active material with a charging cut-off voltage of greater than or equal to 4.5 V.

According to an embodiment of the present application, the positive electrode active material with a charging cut-off voltage of greater than or equal to 4.5 V includes at least one of lithium cobaltate, a spinel lithium nickel manganese material, or a lithium-rich manganese-based material.

According to an embodiment of the present application, the binder includes at least one of fluorine-containing resin, polypropylene resin, a fibrous binder, a rubber binder, or a polyimide binder.

According to an embodiment of the present application, based on a total weight of the conductive agent, the positive electrode active material, and the binder, a weight percentage of the conductive agent is approximately 3.5 wt % to approximately 10 wt %.

According to an embodiment of the present application, the present application further provides an electrochemical apparatus, including any one of the foregoing positive electrodes.

According to an embodiment of the present application, the present application further provides an electronic apparatus, including any one of the foregoing electrochemical apparatuses.

Additional aspects and benefits of the embodiments of the present application will be partly described, demonstrated, or illustrated through implementation of the embodiments of the present application in subsequent descriptions.

BRIEF DESCRIPTION OF DRAWINGS

To describe embodiments of the present application, the following briefly describes the accompanying drawings required for describing the embodiments of the present application or the prior art. Apparently, the accompanying drawings described below are merely some embodiments of the present application. A person skilled in the art may still derive drawings for other embodiments from structures shown in these accompanying drawings without creative efforts.

DETAILED DESCRIPTION

Figure 1:
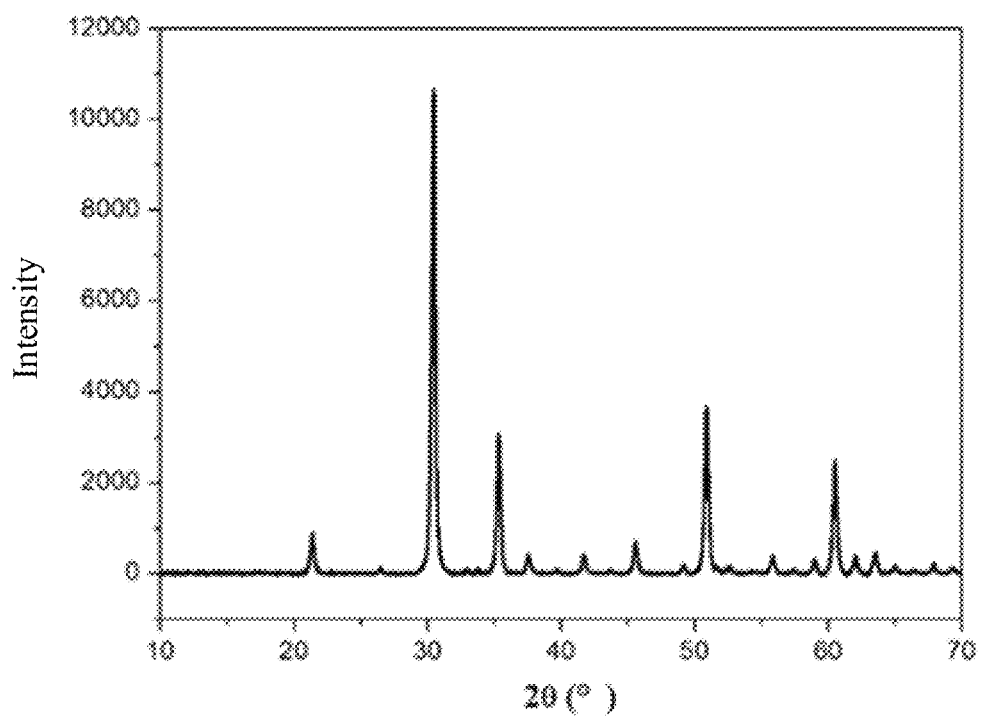
FIG. 1 is an X-ray diffraction (XRD) diagram of indium tin oxide in Example 3.

Embodiments of the present application will be described in detail below. In the specification of the present application, identical or similar assemblies or assemblies with identical or similar functions are represented by similar reference numerals in the accompanying drawings. The embodiments in related accompanying drawings described herein are descriptive, illustrative, and are used to provide a basic understanding of the present application. The embodiments of the present application should not be interpreted as any limitation on the present application.

As used herein, terms "about", "roughly", "substantially" and "approximately" are used to describe and explain a small variation. When used in combination with an event or a case, the terms may refer to an example in which the event or case exactly occurs and an example in which the event or case similarly occurs. For example, when used in combination with a value, the terms may refer to a variation range being less than or equal to ±10% of the value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of a mean value of the values (such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are "roughly" equal.

In addition, a quantity, a ratio, or another numerical value is given in a range format sometimes herein. It is to be understood that such a range format is used for convenience and simplicity and should be flexibly interpreted to not only include the numerical values explicitly specified as the limits of the range, but also include all individual numerical values or subranges covered within the range, as if each numerical value and subrange are explicitly specified.

In the description of embodiments and the claims, a list of items preceded by the terms such as "at least one of", "at least one type of", or other similar terms may mean any combination of the listed items. For example, if Item A and Item B are listed, the phrase "at least one of A and B" means only A, only B, or A and B. In another example, if Item A, Item B, and Item C are listed, then the phrase "at least one of A, B, and C" means only A, only B, only C, A and B (excluding C), A and C (excluding B), B and C (excluding A), or all of A, B, and C. Item A may include a single element or a plurality of elements. Item B may include a single element or a plurality of elements. Item C may include a single element or a plurality of elements.

A current research highlight is how to expand the charging cut-off voltage of positive electrode active materials to obtain a higher specific capacity. However, a high voltage system poses higher requirements for conductive agents. Traditional conductive agents are some carbon-based materials such as conductive carbon black, carbon fiber, acetylene black, Ketjen black, graphene, and carbon nanotube. When cycling in a high voltage system for a long period of time, these carbon materials can be oxidized to generate carbonas, which deteriorates conductivity, increases battery impedance, and accelerates failure of the battery due to severe polarization.

In view of this, the present application provides a new positive electrode that includes no carbon material. The positive electrode includes a conductive agent that includes a non-carbon material. The conductive agent may include a semiconducting oxide. The semiconducting oxide is stable in properties, resistant to high-voltage and oxidization, and insensitive to the environment. Its good conductivity can be permanently retained and an adverse impact of a failure of the conductive agent on a high voltage system can be eliminated. As a result, cycle performance of an electrochemical apparatus under a high voltage is effectively improved.

I. Positive Electrode

The present application provides a positive electrode. The positive electrode includes a conductive agent, where the conductive agent includes a non-carbon material.

In some embodiments, the non-carbon material contains a semiconducting oxide. The semiconducting oxide includes at least one of tin oxide, indium oxide, antimony tin oxide, or indium tin oxide.

In some embodiments, the semiconducting oxide is antimony tin oxide. A molar ratio of antimony to tin in the semiconducting oxide is approximately 0.1:1 to 0.5:1. In some embodiments, the semiconducting oxide is antimony tin oxide. A molar ratio of antimony to tin in the semiconducting oxide is approximately 0.1:1 to 0.2:1, approximately 0.1:1 to 0.3:1, approximately 0.1:1 to 0.4:1, approximately 0.2:1 to 0.5:1, or the like.

In some embodiments, the semiconducting oxide is indium tin oxide. A molar ratio of tin to indium in the semiconducting oxide is approximately 0.1:1 to 0.5:1. In some embodiments, the semiconducting oxide is indium tin oxide. A molar ratio of tin to indium in the semiconducting oxide is approximately 0.1:1 to 0.2:1, approximately 0.1:1 to 0.3:1, approximately 0.1:1 to 0.4:1, approximately 0.2:1 to 0.5:1, or the like.

In some embodiments, a particle diameter of the conductive agent is less than or equal to approximately 100 nm. In some embodiments, a particle diameter of the conductive agent is less than or equal to approximately 90 nm, less than or equal to approximately 80 nm, or less than or equal to approximately 75 nm. In some embodiments, a particle diameter of the conductive agent is approximately 50 nm to approximately 75 nm, approximately 50 nm to approximately 100 nm, or the like.

In some embodiments, a particle diameter of the conductive agent is less than or equal to approximately 50 nm. In some embodiments, a particle diameter of the conductive agent is less than or equal to approximately 40 nm, less than or equal to approximately 30 nm, less than or equal to approximately 20 nm, or less than or equal to approximately 10 nm. In some embodiments, a particle diameter of the conductive agent is approximately 10 nm to approximately 20 nm, approximately 10 nm to approximately 30 nm, approximately 10 nm to approximately 50 nm, approximately 20 nm to approximately 40 nm, approximately 20 nm to approximately 50 nm, approximately 30 nm to approximately 50 nm, approximately 40 nm to approximately 50 nm, or the like.

In some embodiments, the positive electrode in the present application further includes a positive electrode active material and a binder, where the positive electrode active material includes a positive electrode active material with a charging cut-off voltage of greater than or equal to 4.5 V.

In some embodiments, the positive electrode active material with a charging cut-off voltage of greater than or equal to 4.5 V includes at least one of lithium cobaltate, a spinel lithium nickel manganese material, or a lithium-rich manganese-based material. In some embodiments, the positive electrode active material is lithium cobaltate.

In some embodiments, based on a total weight of the conductive agent, the positive electrode active material, and the binder, a weight percentage of the positive electrode active material is approximately 80 wt % to approximately 95 wt %. In some embodiments, based on a total weight of the conductive agent, the positive electrode active material, and the binder, a weight percentage of the positive electrode active material is approximately 80 wt % to approximately 85 wt %, approximately 80 wt % to approximately 90 wt %, approximately 85 wt % to approximately 90 wt %, approximately 85 wt % to approximately 95 wt %, or the like.

In some embodiments, the binder includes at least one of fluorine-containing resin, polypropylene resin, a fibrous binder, a rubber binder, or a polyimide binder. In some embodiments, the binder is the fluorine-containing resin. In some embodiments, the binder is the polyvinylidene fluoride.

In some embodiments, based on a total weight of the conductive agent, the positive electrode active material, and the binder, a weight percentage of the binder is approximately 1.5 wt % to approximately 10 wt %. In some embodiments, based on a total weight of the conductive agent, the positive electrode active material, and the binder, a weight percentage of the binder is approximately 1.5 wt % to approximately 5 wt %, approximately 5 wt % to approximately 10 wt %, approximately 1.5 wt % to approximately 3 wt %, approximately 3 wt % to approximately 5 wt %, approximately 5 wt % to approximately 8 wt %, approximately 3 wt % to approximately 8 wt %, or the like.

In some embodiments, based on a total weight of the conductive agent, the positive electrode active material, and the binder, a weight percentage of the semiconducting oxide is approximately 3.5 wt % to approximately 10 wt %. In some embodiments, based on a total weight of the conductive agent, the positive electrode active material, and the binder, a weight percentage of the conductive agent is approximately 3.5 wt % to approximately 5 wt %, approximately 5 wt % to approximately 10 wt %, or the like.

A positive electrode may be prepared by using a preparation method well known in the art. For example, the positive electrode may be obtained by using the following method: mixing a positive electrode active material, a conductive agent, and a binder in a solvent based on a specific percentage to obtain a positive electrode paste, and coating the positive electrode paste on a positive electrode current collector to prepare a positive electrode. In some embodiments, the solvent may include but is not limited to N-methylpyrrolidone. In some embodiments, the positive electrode current collector may be aluminum but is not limited thereto.

The conductive agent in the present application is a non-carbon material, which eliminates risks of increased resistance caused by oxidization of a carbon material of a conductive agent due to long time cycling under a high voltage and generation of carbonas, and accelerated failure of a battery due to increased polarization. By adding nanoscale semiconducting oxide as a conductive agent, cycle performance of a lithium-ion battery under a high voltage is effectively improved. The semiconducting oxide has good conductivity, is insensitive to external environments such as heat and humidity, and is resistant to high-voltage and oxidization. It is an ideal conductive agent for a high voltage system.

In addition, the conductive agent in the present application may be directly used together with a positive electrode active material and a binder for paste preparation and coating without changing an original production process or requiring special production equipment and special processing procedures. It is simple and convenient in operation and has good prospect in commercial application.

II. Electrochemical Apparatus

An electrochemical apparatus in the present application includes any one of the foregoing positive electrodes in the present application. The electrochemical apparatus in the present application may include any apparatus on which electrochemical reactions occur. Its specific examples include all kinds of primary batteries, secondary batteries, fuel batteries, solar batteries, or capacitors. Particularly, the electrochemical apparatus is a lithium secondary battery, including a lithium metal secondary battery, a lithium-ion secondary battery, a lithium polymer secondary battery, or a lithium-ion polymer secondary battery. In some embodiments, the electrochemical apparatus in the present application includes the positive electrode in the present application, a negative electrode, a separator placed between the positive electrode and the negative electrode, and an electrolyte solution. In some embodiments, the electrochemical apparatus is a lithium-ion battery.

In some embodiments, the negative electrode includes a negative electrode current collector and a negative electrode active material layer on the negative electrode current collector. The negative electrode active material includes a material that reversibly embeds/de-embeds lithium ions. In some embodiments, the material that reversibly embeds/de-embeds lithium ions includes a carbon material. In some embodiments, the carbon material may be any carbon based negative electrode active material that is generally used in a lithium-ion rechargeable battery. In some embodiments, the carbon material includes but is not limited to crystalline carbon, amorphous carbon, or a mixture thereof. The crystalline carbon may be amorphous, plate-shaped, flake-shaped, spherical, or fiber-shaped natural graphite, or artificial graphite. The amorphous carbon may be soft carbon, hard carbon, mesophase pitch carbonization product, fired coke, or the like.

In some embodiments, the negative electrode active material includes but is not limited to lithium metal, structured lithium metal, natural graphite, artificial graphite, mesophase carbon microbeads (MCMB), hard carbon, soft carbon, silicon, silicon-carbon composite, Li—Sn alloy, Li—Sn—O alloy, Sn, SnO, $SnO_2$, spinel-structure lithium $TiO_2$—$Li_4Ti_5O_{12}$, Li—Al alloy, or any combination thereof.

When the negative electrode includes a silicon-carbon compound, based on a total weight of the negative electrode active material, a ratio of silicon to carbon is approximately 1:10 to 10:1 and a median particle diameter D50 of the silicon-carbon compound is approximately 0.1 μm to 100 μm. When the negative electrode includes an alloy material, a negative electrode active substance layer may be formed by using a method such as evaporation, vapor deposition, and plating. When the negative electrode includes lithium metal, for example, the negative electrode active substance layer is formed by using a spherical twisted conductive framework and metal particles dispersed in the conductive framework. In some embodiments, the spherical twisted conductive framework may have a porosity of approximately 5% to approximately 85%. In some embodiments, a protection layer may be further provided on the lithium metal negative electrode active substance layer.

In some embodiments, the negative electrode may further include a binder. The binder enhances binding between particles of the negative electrode active material, and binding between the negative electrode active material and the negative electrode current collector. In some embodiments, the binder includes but is not limited to polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene 1,1-difluoroethylene, polyethylene, polypropylene, styrene-butadiene rubber, acrylic styrene-butadiene rubber, epoxy resin, nylon, and the like.

In some embodiments, the negative electrode may further include a conductive agent. The conductive agent includes but is not limited to a carbon-based material, a metal-based material, a conductive polymer, or a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powder, metal fiber, copper, nickel, aluminum, and silver. In some embodiments, the conductive polymer is a polyphenylene derivative.

In some embodiments, the negative electrode current collector includes but is not limited to copper foil, nickel foil, stainless steel foil, titanium foil, nickel foam, copper foam, a polymer base coated with conductive metal, and any combination thereof.

A negative electrode may be prepared by using a preparation method well known in the art. For example, the negative electrode may be obtained by using the following method: mixing an active material, a conductive agent, and a binder in a solvent to obtain an active material composition, and coating the active material composition on a current collector. In some embodiments, the solvent may include but is not limited to water.

In some embodiments, the separator includes but is not limited to at least one selected from polyethylene, polypropylene, polyethylene terephthalate, polyimide, and aramid fiber. For example, polyethylene includes at least one component selected from high-density polyethylene, low-density polyethylene, and ultra high molecular weight polyethylene. In particular, polyethylene and polypropylene are good to avoid short circuit and can improve stability of lithium-ion batteries through a turn-off effect.

In some embodiments, an electrolyte may be one or more of a gel electrolyte, a solid electrolyte, and an electrolyte solution. The electrolyte solution includes a lithium salt and a non-aqueous solvent.

In some embodiments, the lithium salt may be selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, $LiPF_6$ is used as the lithium salt because $LiPF_6$ can provide high ionic conductivity and improve a cycle characteristic.

In some embodiments, the non-aqueous solvent may be a carbonate compound, a carboxylate compound, an ether compound, another organic solvent, or a combination thereof.

In some embodiments, the carbonate compound may be a linear carbonate compound, a cyclic carbonate compound, a fluorocarbonate compound, or a combination thereof.

In some embodiments, an example of the linear carbonate compound is diethyl carbonate (DEC), dimethyl carbonate (DMC), dipropyl carbonate (DPC), methyl propyl carbonate (MPC), ethyl propyl carbonate (EPC), ethyl methyl carbonate (MEC), and a combination thereof. An example of the cyclic carbonate compound is ethylene carbonate (EC), propylene carbonate (PC), butylene carbonate (BC), vinylethylene carbonate (VEC), or a combination thereof. An example of the fluorocarbonate compound is fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene carbonate, 1-fluoro-1-methylethylene carbonate, 1,2-difluoro-1-methylethylene carbonate, 1,1,2-trifluoro-2-methylethylene carbonate, trifluoromethyl ethylene carbonate, or a combination thereof.

In some embodiments, an example of the carboxylate compound is methyl acetate, ethyl acetate, propyl acetate, butyl acetate, methyl propionate, ethyl propionate, propyl propionate, γ-butyrolactone, decalactone, valerolactone, dl-mevalonic acid lactone, caprolactone, methyl formate, or a combination thereof.

In some embodiments, an example of the ether compound is dibutyl ether, tetraethyleneglycol dimethyl ether, diethylene glycol dimethyl ether, 1,2-dimethoxyethane, 1,2-diethoxyethane, ethoxymethoxy ethane, 2-methyltetrahydrofuran, tetrahydrofuran, or a combination thereof.

In some embodiments, an example of the another organic solvent is dimethyl sulfoxide, 1,2-dioxane, sulfolane, methylsulfolane, 1,3-dimethyl-2-imidazolidinone, N-methyl-2-pyrrolidinone, methane amide, dimethylformamide, acetonitrile, trimethyl phosphate, triethyl phosphate, trioctyl phosphate, phosphate ester, or a combination thereof.

III. Application

An electrochemical apparatus including the positive electrode described in the present application is applicable to electronic apparatuses in various fields.

A purpose of the electrochemical apparatus in the present application is not specifically limited. It can be used for any known purpose in the prior art. In an embodiment, the electrochemical apparatus in the present application may be used in but being not limited to a notebook computer, a pen-input computer, a mobile computer, an e-book player, a portable phone, a portable fax, a portable copier, a portable printer, a headphone stereo, a video recorder, a liquid crystal display television, a handy cleaner, a portable CD player, a mini disk, a transceiver, an electronic notebook, a calculator, a memory card, a portable recorder, a radio, a backup power supply, a motor, a vehicle, a motorcycle, a power assisted cycle, a bicycle, a lighting appliance, a toy, a game player, a clock, an electric tool, a flash lamp, a camera, a large household battery, a lithium-ion capacitor, or the like.

IV. Examples

Below, the present application is further specifically described with Examples and Comparative Examples, and the present application is not limited to these Examples as long as the essence of the present application is not changed.

Example 1

$LiCoO_2$, polyvinylidene fluoride, and indium oxide were uniformly mixed at a weight ratio of 95:1.5:3.5, followed by coating, cold pressing, and punching, to prepare a positive electrode plate. A particle diameter of the indium oxide was 17 nm to 28 nm.

A button half-cell was assembled by using the prepared positive electrode plate as a working electrode and metal lithium as a counter electrode, and a cycle performance test was performed on the assembled button half-cell.

Example 2

$LiCoO_2$, polyvinylidene fluoride, and indium oxide were uniformly mixed at a weight ratio of 80:10:10, followed by coating, cold pressing, and punching, to prepare a positive electrode plate. A particle diameter of the indium oxide was 17 nm to 28 nm.

A button half-cell was assembled by using the prepared positive electrode plate as a working electrode and metal lithium as a counter electrode, and a cycle performance test was performed on the assembled button half-cell.

Example 3

$LiCoO_2$, polyvinylidene fluoride, and indium tin oxide (tin:indium=0.5:1) were uniformly mixed at a weight ratio of 95:1.5:3.5, followed by coating, cold pressing, and punching, to prepare a positive electrode plate. A particle diameter of the indium tin oxide was 17 nm to 28 nm.

A button half-cell was assembled by using the prepared positive electrode plate as a working electrode and metal lithium as a counter electrode, and a cycle performance test was performed on the assembled button half-cell.

Example 4

$LiCoO_2$, polyvinylidene fluoride, and indium tin oxide (tin:indium=0.1:1) were uniformly mixed at a weight ratio of 80:10:10, followed by coating, cold pressing, and punching, to prepare a positive electrode plate. A particle diameter of the indium tin oxide was 17 nm to 28 nm.

A button half-cell was assembled by using the prepared positive electrode plate as a working electrode and metal lithium as a counter electrode, and a cycle performance test was performed on the assembled button half-cell.

Example 5

This example was basically the same as Example 1, except that a non-carbon conductive agent was tin oxide.

Example 6

This example was basically the same as Example 4, except that anon-carbon conductive agent was antimony tin oxide (antimony:tin=0.1:1).

Example 7

This example was basically the same as Example 1, except that a particle diameter of indium oxide was 50 nm to 75 nm.

Example 8

This example was basically the same as Example 2, except that a particle diameter of indium oxide was 50 nm to 75 nm.

Example 9

This example was basically the same as Example 3, except that a particle diameter of indium tin oxide was 50 nm to 75 nm.

Example 10

This example was basically the same as Example 4, except that a particle diameter of indium tin oxide was 50 nm to 75 nm.

Example 11

This example was basically the same as Example 1, except that a particle diameter of indium oxide was 1 nm to 10 nm.

Example 12

This example was basically the same as Example 3, except that a particle diameter of indium tin oxide was 1 nm to 10 nm.

Comparative Example 1

LiCoO$_2$, polyvinylidene fluoride, and conductive carbon black were uniformly mixed at a weight ratio of 95:1.5:3.5, followed by coating, cold pressing, and punching, to prepare a positive electrode plate.

A button half-cell was assembled by using the prepared positive electrode plate as a working electrode and metal lithium as a counter electrode, and a cycle performance test was performed on the assembled button half-cell.

Comparative Example 2

LiCoO$_2$, polyvinylidene fluoride, and conductive carbon black were uniformly mixed at a weight ratio of 80:10:10, followed by coating, to prepare a positive electrode plate.

A button half-cell was assembled by using the prepared positive electrode plate as a working electrode and metal lithium as a counter electrode, and a cycle performance test was performed on the assembled button half-cell.

V. Test Methods and Test Results

X-Ray Diffraction Test

An X-ray diffraction test instrument (PANalytical, XPert-Pro MPD) was used. Test conditions were set: In Cu K$_\alpha$ radiation ($\lambda$=1.5418 Å), a working current was 250 mA, continuous scanning was used, a working voltage was 40 kV, a scanning range 2θ was 10° to 70°, with a step of 0.1°, and a scanning speed is 0.2 seconds/step. An X-ray diffraction test was conducted on sample powder to determine a phase of the sample.

Cycle Performance Test

In the present application, the LAND CT2001A system was used to test cycle performance of an electrochemical apparatus. A to-be-tested button cell was stood in an environment of 25±3° C. for 30 minutes. The cell was charged to a voltage of 4.5 V and 4.6 V at a constant current rate of 0.1 C (4.5 V and 4.6 V, with a theoretical gram capacity of LiCoO$_2$ being respectively 190 mAh/g and 220 mAh/g). Subsequently, the cell was charged to a current of 0.025 C at a constant voltage. Then, the cell was discharged to 3 V at a rate of 0.1 C. The foregoing charge/discharge steps were repeated for 50 cycles, and discharge gram capacities before and after the cycles were recorded.

Discharge gram capacity=Discharge capacity/Weight of positive electrode active substance (lithium cobaltate).

Table 1 shows cycle performance test results for Comparative Example 1, Comparative Example 2, and Example 1 to Example 10.

TABLE 1

| Voltage | Example | Specific Capacity of First Cycle (mAh/g) | Specific Capacity after 50 Cycles (mAh/g) | Capacity Retention Rate |
|---|---|---|---|---|
| 4.5 V | Comparative Example 1 | 191.5 | 157.6 | 82.3% |
| | Comparative Example 2 | 192.2 | 146.5 | 76.2% |
| | Example 1 | 192.8 | 176.4 | 91.5% |
| | Example 2 | 193.4 | 177.5 | 91.8% |
| | Example 3 | 193.1 | 175.5 | 90.9% |
| | Example 4 | 193.9 | 178.4 | 92.0% |
| | Example 5 | 192.9 | 175.0 | 90.7% |
| | Example 6 | 193.6 | 177.5 | 91.7% |
| | Example 7 | 190.1 | 167.7 | 88.2% |
| | Example 8 | 191.3 | 170.8 | 89.3% |
| | Example 9 | 191.8 | 169.6 | 88.4% |
| | Example 10 | 192.4 | 171.4 | 89.1% |
| | Example 11 | 192.7 | 176.2 | 91.4% |
| | Example 12 | 193.2 | 175.4 | 90.8% |
| 4.6 V | Comparative Example 1 | 221.2 | 164.4 | 74.3% |
| | Comparative Example 2 | 223.4 | 154.4 | 69.1% |
| | Example 1 | 223.8 | 191.6 | 85.6% |
| | Example 2 | 224.3 | 193.1 | 86.1% |
| | Example 3 | 224.7 | 191.9 | 85.4% |
| | Example 4 | 225.0 | 194.2 | 86.3% |
| | Example 5 | 224.2 | 190.3 | 84.9% |
| | Example 6 | 224.2 | 192.4 | 85.8% |
| | Example 7 | 220.8 | 183.5 | 83.1% |
| | Example 8 | 222.0 | 185.4 | 83.5% |
| | Example 9 | 222.3 | 185.0 | 83.2% |
| | Example 10 | 222.9 | 187.2 | 84.0% |
| | Example 11 | 223.7 | 191.6 | 85.7% |
| | Example 12 | 224.8 | 191.8 | 85.3% |

Figure 2:
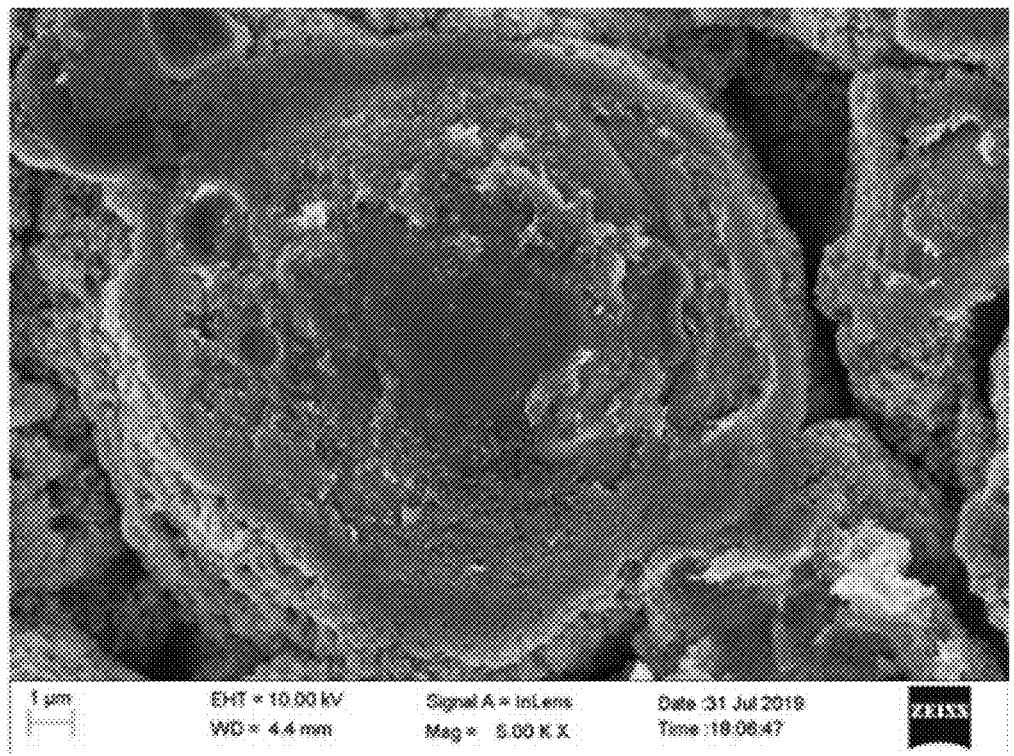
FIG. 2 is a scanning electron microscope (SEM) diagram of a positive electrode plate in Example 3.
Figure 3:
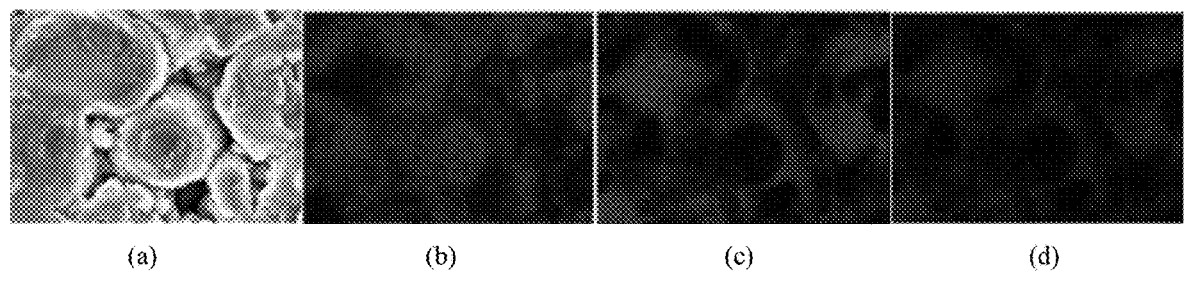
FIG. 3(a) is a SEM diagram of a positive electrode plate in Example 3.
FIG. 3(b) to FIG. 3(d) are respectively scanning electron microscope-energy dispersive spectrometer (SEM-EDS) diagrams of a cobalt element, an indium element, and a tin element in the positive electrode plate in Example 3.

FIG. 1 is an XRD diagram of indium tin oxide in Example 3. It could be learned from FIG. 1 that a spectral peak was sharp and intensity was relatively high, indicating that a crystal form of indium tin oxide particles was intact and the crystallinity was relatively high. FIG. 2 is a SEM diagram of a positive electrode plate in Example 3. FIG. 3(a) is a SEM diagram of a positive electrode plate in Example 3, and FIG. 3(b) to FIG. 3(d) are respectively SEM-EDS diagrams of a cobalt element, an indium element, and a tin element in the positive electrode plate in Example 3. FIG. 3(a) to FIG. 3(d) show distribution of indium tin oxide in the positive electrode plate in Example 3. It could be seen from FIG. 3 that indium tin oxide was evenly dispersed around positive electrode active substance particles in relatively even distribution.

It could be learned from comparison among Comparative Example 1 and Comparative Example 2 that a cycle capacity retention rate in Comparative Example 2 was lower than that in Comparative Example 1, regardless of whether a cycle cut-off voltage was 4.5 V or 4.6 V. This was mainly because percentages of components in the positive electrode plate were different. Compared with Comparative Example 1, Comparative Example 2 had a higher content of conductive carbon black. A case of failure due to oxidization in a high cut-off voltage cycle process was more severe, leading to decreased electronic conductivity of a lithium-ion battery, severe polarization, and a failure to effectively use its capacity.

It could be learned from comparison among Comparative Example 1 and Example 1, Example 3, Example 5, Example 7, and Example 9 (or between Comparative Example 2 and Example 2, Example 4, Example 6, Example 8, and Example 10) that when the positive electrode plate did not contain conductive carbon black and cycles under the same cut-off voltage, a capacity retention rate of the lithium-ion battery could be greatly increased. After 50 cycles at 4.5 V, when weight percentage content of the conductive agent was 3.5%, a capacity retention rate of the Example was in a range of 88.2% to 91.5%, an increase of approximately 5.9% to 9.2% from that of Comparative Example 1; and when the weight percentage content of the conductive agent was 10%, the capacity retention rate of the Example was in a range of 89.1% to 92.0%, an increase of approximately 12.9% to 15.8% from that of Comparative Example 2. For cycles at 4.6 V, the capacity retention rate of the Example showed a more apparent increase over that of the Comparative Examples. When the weight percentage content of the conductive agent was 3.5%, the capacity retention rate of the Example was in a range of 83.1% to 85.6%, an increase of approximately 8.8% to 11.3% from that of Comparative Example 1; and when the weight percentage content of the conductive agent was 10%, the capacity retention rate of the Example was in a range of 83.5% to 86.3%, an increase of approximately 14.4% to 17.2% from that of Comparative Example 2.

It could be learned from comparison among Example 1 to Example 6 and Example 7 to Example 10 that when a particle size of the conductive agent was relatively small, an effect of increasing the capacity retention rate was better. This was because when a particle size of the conductive agent was smaller, a quantity of particles per unit mass of the conductive agent was larger, and electronic channels constructed between particles of the positive electrode active material were more abundant, which is better to reduce a polarization effect brought about by side reactions of the battery. When a particle diameter of the conductive agent was greater than 50 nm, it was adverse to play optimal performance of the conductive agent. It could be learned from a comparison between Example 11, Example 12, Example 1, and Example 3 that when the particle diameter of the conductive agent was less than 10 nm, the capacity retention rate was not further increased. This was mainly because when the particle diameter was 10 nm to 30 nm, electronic channels constructed between particles of the positive electrode active material were saturated, and a further decrease of the particle diameter of the conductive agent had an unapparent impact on the capacity retention rate.

It could be learned from comparison among Example 1 to Example 6, Example 11, and Example 12 that different conductive agents and conductive agents with different percentages of elements produced basically the same conductivity effects, and had a similar effect on increasing the capacity retention rate.

The positive electrode in the present application uses the semiconducting oxide as the conductive agent. The semiconducting oxide is insensitive to external environments such as heat and humidity, is resistant to high-voltage and oxidization, and can permanently retain good conductivity. Compared with a carbon material, the semiconducting oxide is more suitable for a high voltage system and has greater value of application in next-generation positive electrode active materials such as a lithium-rich manganese-based material or a spinel lithium nickel manganese material that have high specific capacities and high cut-off voltage.

In this specification, reference to "some embodiments", "an embodiment", "another example", "examples", "specific examples", or "some examples" means that at least one embodiment or example in the present application includes a specific feature, structure, material, or characteristic described in this embodiment or example. Therefore, descriptions that appear in various parts of this specification, such as "in some embodiments", "in the embodiments", "in an embodiment", "in another example", "in an example", "in a specific example", or "examples" do not necessarily reference the same embodiment or example in the present application. In addition, a specific feature, structure, material, or characteristic herein may be combined in any appropriate manner in one or more embodiments or examples.

Although illustrative embodiments have been demonstrated and described, a person skilled in the art should understand that the foregoing embodiments cannot be construed as limitations on the present application, and changes, substitutions, and modifications can be made to the embodiments without departing from the spirit, principle, and scope of the present application.

What is claimed is:

1. A positive electrode, comprising: a conductive agent, wherein the conductive agent comprises a non-carbon material-; wherein the non-carbon material comprises a semiconducting oxide; wherein the semiconducting oxide comprises at least one of tin oxide, indium oxide, antimony tin oxide, or indium tin oxide; and a particle diameter of the conductive agent is less than or equal to approximately 100 nm.

2. The positive electrode according to claim 1, wherein the semiconducting oxide is the indium tin oxide, a molar ratio of tin to indium in the semiconducting oxide is 0.1:1 to 0.5:1.

3. The positive electrode according to claim 1, wherein the semiconducting oxide is the antimony tin oxide a molar ratio of antimony to tin in the semiconducting oxide is 0.1:1 to 0.5:1.

4. The positive electrode according to claim 1, wherein a particle diameter of the conductive agent is less than or equal to approximately 50 nm.

5. The positive electrode according to claim 1, further comprising a positive electrode active material and a binder, wherein the positive electrode active material comprises a positive electrode active material with a charging cut-off voltage of greater than or equal to 4.5 V.

6. The positive electrode according to claim 5, wherein the positive electrode active material with a charging cut-off voltage of greater than or equal to 4.5 V comprises at least one of lithium cobaltate, a spinel lithium nickel manganese, or a lithium-rich manganese-based material.

7. The positive electrode according to claim 5, wherein the binder comprises at least one of fluorine-containing resin, polypropylene, a fibrous binder, a rubber binder, or a polyimide binder.

8. The positive electrode according to claim 5, wherein based on a total weight of the conductive agent, the positive electrode active material and the binder, a weight percentage of the conductive agent is 3.5 wt % to 10 wt %.

9. An electrochemical apparatus, comprising a positive electrode, wherein the positive electrode comprises a conductive agent, wherein the conductive agent comprises a non-carbon material; wherein the non-carbon material comprises a semiconducting oxide; wherein the semiconducting oxide comprises at least one of tin oxide, indium oxide, antimony tin oxide, or indium tin oxide; and a particle diameter of the conductive agent is less than or equal to approximately 100 nm.

10. The electrochemical apparatus according to claim 9, wherein the positive electrode further comprises a positive electrode active material and a binder, wherein the positive electrode active material comprises a positive electrode active material with a charging cut-off voltage of greater than or equal to 4.5 V.

11. The electrochemical apparatus according to claim 9, wherein based on a total weight of the conductive agent, the positive electrode active material and the binder, a weight percentage of the conductive agent is 3.5 wt % to 10 wt %.

12. The electrochemical apparatus according to claim 9, wherein based on a total weight of positive electrode paste on positive electrode current collector, a weight percentage of the conductive agent is 3.5 wt % to 10 wt %.

13. An electronic apparatus, comprising: an electrochemical apparatus, the electrochemical apparatus comprises a conductive agent, wherein the conductive agent comprises a non-carbon material; wherein the non-carbon material comprises a semiconducting oxide; wherein the semiconducting oxide comprises at least one of tin oxide, indium oxide, antimony tin oxide, or indium tin oxide; and a particle diameter of the conductive agent is less than or equal to approximately 100 nm.

* * * * *